(12) United States Patent
Huang et al.

(10) Patent No.: US 9,030,184 B2
(45) Date of Patent: May 12, 2015

(54) DC-DC CONVERTER AND VOLTAGE CONVERSION METHOD THEREOF

(75) Inventors: Hua-Chiang Huang, Taoyuan County (TW); Jiun-Chiang Chen, Hsinchu County (TW); Wei-Ling Chen, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 161 days.

(21) Appl. No.: 13/615,615

(22) Filed: Sep. 14, 2012

(65) Prior Publication Data

US 2013/0200864 A1    Aug. 8, 2013

(30) Foreign Application Priority Data

Feb. 2, 2012    (TW) .............................. 101103396 A (51) Int. Cl.
*G05F 1/00* (2006.01)
*H02M 3/156* (2006.01)

(52) U.S. Cl.
CPC .................................... *H02M 3/156* (2013.01)

(58) Field of Classification Search
CPC ................ G05F 1/24; G05F 1/40; G05F 1/46
USPC ........................... 323/234, 259, 271, 282–285
See application file for complete search history.

(56) References Cited

U.S. PATENT DOCUMENTS

| 5,808,455 | A  | * | 9/1998  | Schwartz et al. | 323/285 |
| 7,821,236 | B2 | * | 10/2010 | Hasegawa et al. | 323/286 |
| 7,843,177 | B2 | * | 11/2010 | Ho et al.       | 323/222 |
| 7,923,977 | B2 |   | 4/2011  | Huang           |         |
| 2006/0043943 | A1 | * | 3/2006 | Huang et al.   | 323/222 |
| 2006/0119340 | A1 | * | 6/2006 | Tateishi       | 323/284 |
| 2011/0031948 | A1 | * | 2/2011 | Chien et al.   | 323/282 |
| 2011/0241641 | A1 | * | 10/2011 | Chen et al.   | 323/284 |
| 2012/0146594 | A1 | * | 6/2012 | Kobayashi      | 323/234 |

FOREIGN PATENT DOCUMENTS

| TW | 201032453 | 9/2010 |
| TW | M414763   | 10/2011 |

* cited by examiner

*Primary Examiner* — Jue Zhang
(74) *Attorney, Agent, or Firm* — Jianq Chyun IP Office (57) ABSTRACT

A DC-DC converter and a voltage conversion method thereof are provided. The DC-DC converter includes an output unit, a control unit and a trigger unit. The output unit converts an input voltage into an output voltage. The control unit generates a control signal according to the input voltage, an output feedback voltage related to the output voltage and a reference voltage, so as to make the output unit generate the output voltage. The trigger unit generates a first trigger signal according to the control signal, the output feedback voltage and the reference voltage. When the output feedback voltage is less than the reference voltage by a preset voltage, the control unit controls the output unit to perform a voltage-regulating process to the output voltage in advance.

12 Claims, 10 Drawing Sheets

DC-DC CONVERTER AND VOLTAGE CONVERSION METHOD THEREOF

CROSS-REFERENCE TO RELATED APPLICATION

This application claims the priority benefit of Taiwan application serial no. 101103396, filed on Feb. 2, 2012. The entirety of the above-mentioned patent application is hereby incorporated by reference herein and made a part of this specification.

TECHNICAL FIELD

The disclosure relates to a DC-DC converter, and especially relates to a DC-DC converter that improves transient response.

BACKGROUND

It has been well-understood that the central process unit (CPU), dynamic random access memory (DRAM), graphic chip, and chip set in a computer system use different working voltages. Therefore, it requires a number of DC-DC converters in a computer system to convert the DC input voltage provided by power supply into the regulated working voltage required by each element.

A conventional DC-DC converter comprises an error amplifier, a pulse width modulation (PWM) comparator, a driver, and a power switch. The error amplifier is configured to compare the output voltage of the converter with a reference voltage. The PWM comparator is configured to receive the output from the error amplifier, and receive a sawtooth signal (also known as triangular wave signal or ramp signal) as input. The PWM comparator output a PWM signal, which is received by the driver to drive the power switch. Although the conventional DC-DC converter has the advantage of having a simple structure, but the compensation required by the amplifier will result in a slow transient response to load.

SUMMARY

The disclosure provides a DC-DC converter and a voltage conversion method thereof, which can effectively improve slow transient response.

The disclosure provides a DC-DC converter, which includes an output unit, a control unit, and a trigger unit. The output unit receives an input voltage, and converts the input voltage into an output voltage. The control unit is coupled to the output unit, generates a control signal in accordance with the input voltage, an output feedback voltage related to the output voltage, and a reference voltage, and controls the output unit to generate the output voltage. The trigger unit is coupled to the control unit and generates a first trigger signal in accordance with the control signal, the output feedback voltage, and the reference voltage. When the output feedback voltage is less than the reference voltage by a preset value, the first trigger signal triggers the control unit to control the output unit in advance to operate.

In an embodiment of the disclosure, the trigger unit includes a first error amplifier and a logic unit. The first error amplifier receives the reference voltage, the output feedback voltage, and an offset voltage. An input end of the logic unit is coupled to the output end of the first error amplifier, while another input end of the logic unit is coupled to the control unit.

In an embodiment of the disclosure, the logic unit is an OR gate.

In an embodiment of the disclosure, the control unit includes a pulse width modulation (PWM) generator, a sawtooth generator, the first error amplifier, a first comparator, and a driving unit. The first error amplifier receives the output feedback voltage and the reference voltage. The first comparator is coupled to the first error amplifier and the sawtooth generator. The PWM generator is coupled to the sawtooth generator and the driving unit.

In an embodiment of the disclosure, the trigger unit includes a second error amplifier and the logic unit. The second error amplifier receives the reference voltage, the output feedback voltage, and the offset voltage. One input end of the logic unit is coupled to an output end of the second error amplifier, and another input end of the logic unit is coupled to the first comparator.

In an embodiment of the disclosure, the trigger unit includes the second error amplifier and the logic unit. The second error amplifier receives the reference voltage, the output feedback voltage, and the offset voltage. One input end of the logic unit is coupled to the output end of the second error amplifier, and another input end of the logic unit is coupled to the control unit, and an output end of the logic unit is coupled to the PWM generator.

In an embodiment of the disclosure, the trigger unit include the second error amplifier and the logic unit. The second error amplifier receives the reference voltage, the output feedback voltage, and the offset voltage. One input end of the logic unit is coupled to the output end of the second error amplifier, and another input end of the logic unit is coupled to the PWM generator.

In an embodiment of the disclosure, the trigger unit includes a second error amplifier and the logic unit, wherein the second error amplifier receives the reference voltage, the output feedback voltage, and the offset voltage. One input end of the logic unit is coupled to the output end of the second error amplifier, and another input end of the logic unit is coupled to the control unit, and the output end of the logic unit is coupled to the driving unit.

In an embodiment of the disclosure, the trigger unit includes the second error amplifier, a second comparator, and the logic unit. The second error amplifier receives the reference voltage, the output feedback voltage, and the offset voltage. A first input end of the second comparator is coupled to the second error amplifier, and a second input end of the second comparator receives a sawtooth signal. One input end of the logic unit is coupled to an output end of the second comparator, and another input end of the logic unit is coupled to the control unit.

In an embodiment of the disclosure, the first input end of the second comparator is coupled to a compensation circuit.

According to an embodiment of the disclosure, the first input end of the second comparator receives an analog signal.

In an embodiment of the disclosure, another input end of the logic unit is coupled to the output end of the first comparator, and the output end of the logic unit is coupled to the PWM generator.

In an embodiment of the disclosure, another input end of the logic unit is coupled to the PWM generator, and the output end of the logic unit is coupled to the driving unit.

The disclosure further provides a voltage conversion method of DC-DC converter, including the following steps. A reference voltage and an output feedback voltage are compared, wherein the output feedback voltage relates to an output voltage. When the output feedback voltage is less than the reference voltage by a preset value, an error control signal is provided. A control signal is generated according to an input voltage, the output feedback voltage, and the reference voltage. The error control signal and the control signal are used to provide a first trigger signal, such that a voltage-regulating process can be performed to the output voltage in advance.

In an embodiment of the disclosure, a step after the error control signal further includes comparing the error control signal and a sawtooth signal to provide a comparing signal.

In an embodiment of the disclosure, the step of providing the first trigger signal by using the error control signal and the control signal further includes generating a fast response signal according to the comparing signal and the control signal, and performing the voltage-regulating process to the output voltage in advance according to the fast response signal.

Based on the above, the disclosure uses the first trigger signal generated by the trigger unit when the output voltage is less than the reference voltage by the preset value to trigger the control unit, such that the output unit is controlled and the voltage-regulating process to the output voltage is performed to improve transient response of the DC-DC converter to load.

BRIEF DESCRIPTION OF THE DRAWINGS

In order to make the aforementioned and features and advantages of the disclosure more comprehensible, embodiments accompanying figures are described in detail below.

DETAILED DESCRIPTION OF DISCLOSED EMBODIMENTS

Figure 1:
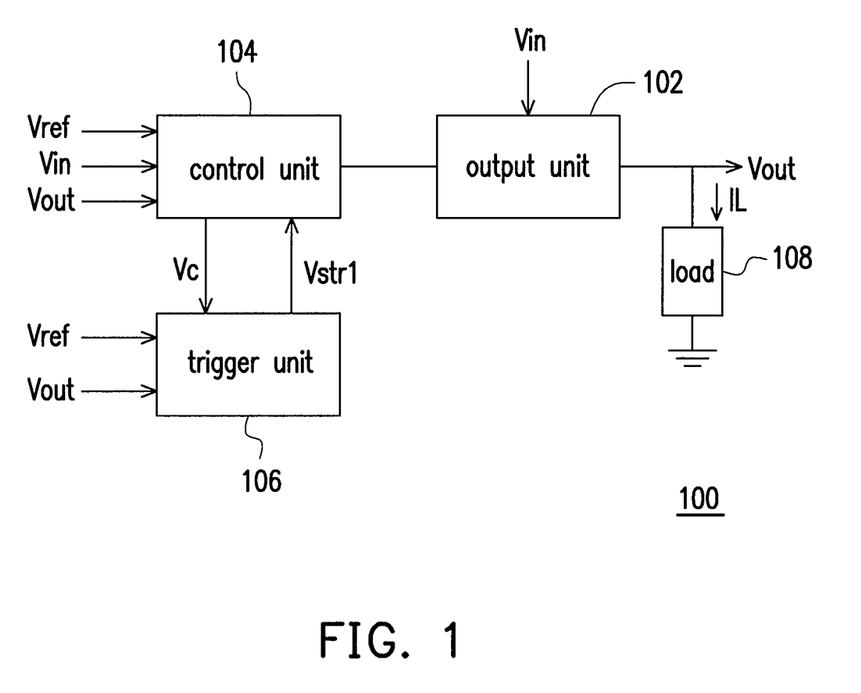
FIG. 1 is a schematic view illustrating a DC-DC converter of an embodiment of the disclosure.

FIG. 1 illustrates an embodiment of a DC-DC converter according to the disclosure. A DC-DC converter 100 includes an output unit 102, a control unit 104, and a trigger unit 106, wherein the control unit 104 is coupled to the output unit 102 and the trigger unit 106, and an output end of the output unit 102 is coupled to a load 108.

The output unit 102 is configured to receive an input voltage Vin, and convert it to an output voltage Vout. The control unit 104 is configured to generate a control signal Vc to the trigger unit 106 in accordance with the input voltage Vin, an output feedback voltage Vout (also known as the output voltage Vout in the embodiment disclosed herein) related to the output voltage Vout, and a reference voltage Vref, and controls the output unit 102 to generate the output voltage Vout. The trigger unit 106 generates a first trigger signal Vstr1 to the control unit 104 in accordance with the control signal Vc, the output voltage Vout, and the reference voltage Vref, such that the control unit 104 is triggered to control the output unit 102 in advance to perform a voltage-regulating process to the output voltage Vout.

For example, when a load current IL of the load 108 increases, the output voltage Vout decreases. When the output voltage Vout is less than the reference voltage Vref by a preset value, the trigger unit 106 generates the first trigger signal Vstr1 according to the control signal Vc, the output voltage Vout, and the reference voltage Vref to trigger the control unit 104 to control the output unit 102 and perform a voltage-regulating process to the output voltage Vout, such that the output voltage can be regulated as soon as possible. Thereby, the goal of improving transient response of the DC-DC converter 100 is achieved.

Figure 2A:
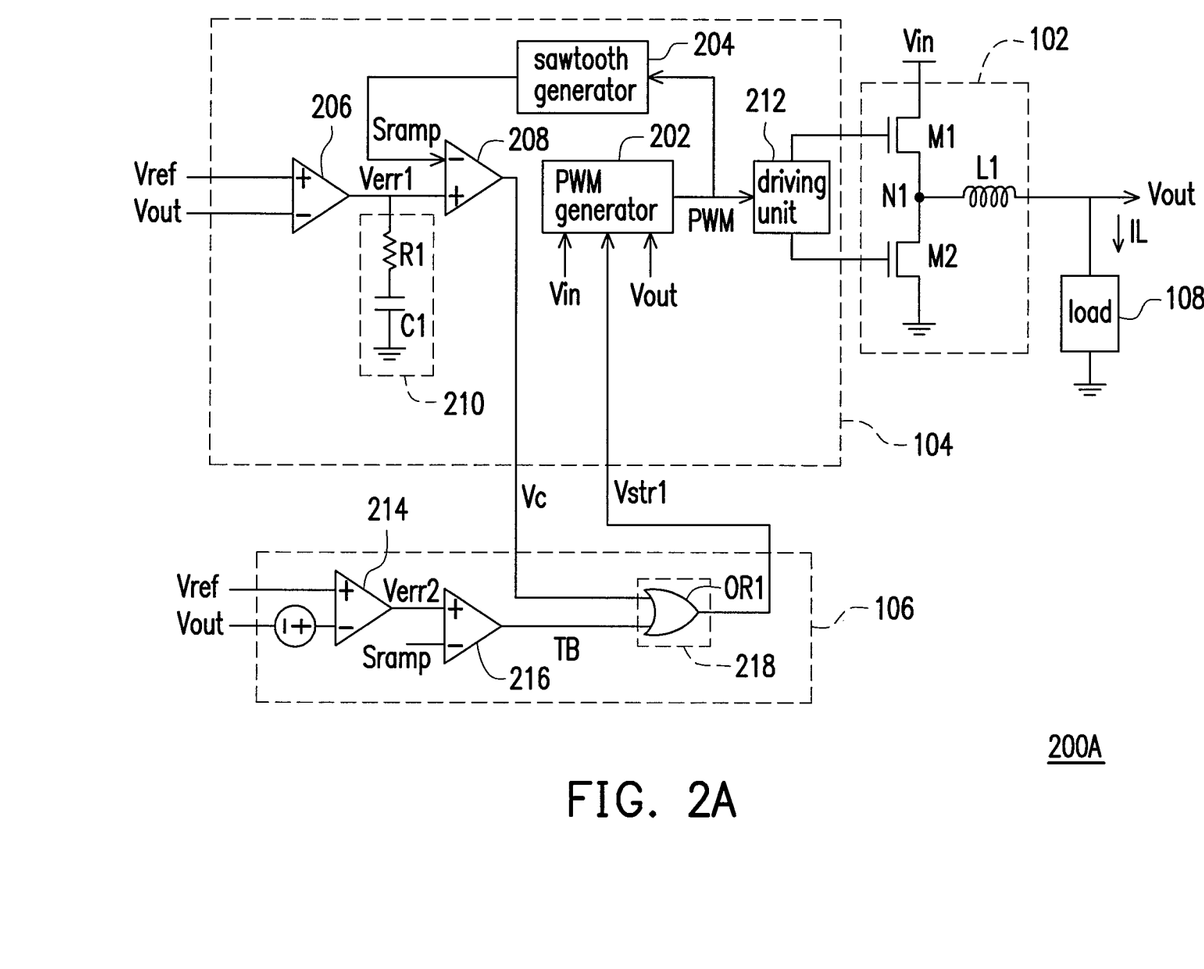
FIGS. 2A-2C are schematic views illustrating a DC-DC converter of embodiments of the disclosure.

FIG. 2A illustrates a schematic diagram of a DC-DC converter of another embodiment of the disclosure. Specifically, the DC-DC converter 100 of FIG. 1 may be implemented in a DC-DC converter 200A illustrated in FIG. 2A. In this embodiment, the output unit 102 may include an inductor L1, a first transistor M1, and a second transistor M2. In other embodiments, the output unit 102 may include only the first transistor M1 and the second transistor M2. A first end of the inductor L1 is coupled to an output end of the DC-DC converter 200A. The first transistor M1 and the second transistor M2 are serially connected between the input voltage Vin and an ground. There is a common node N1 between the first transistor M1 and the second transistor M2, which is coupled to a second end of the inductor L1.

Gates of the first transistor M1 and the second transistor M2, whose conductive status are controlled by the control unit 104, are coupled to the control unit 104. When the second transistor M2 is turned on, the first transistor M1 is turned off. When the first transistor M1 is turned on, the second transistor M2 is turned off.

In addition, the control unit 104 includes a PWM generator 202, a sawtooth generator 204, an error amplifier 206, a comparator 208, a compensation unit 210, and a driving unit 212. In other embodiments, the control unit 104 may not include the compensation unit 210, and the disclosure is not limited thereto.

The PWM generator 202 is coupled to the trigger unit 106, the sawtooth generator 204, and the driving unit 212. The PWM generator 202 is used to generate a PWM signal according to the first trigger signal Vstr1, the input voltage Vin, and the output voltage Vout. In this embodiment, the PWM signal is a pulse width modulation signal with a constant on time, but the disclosure is not limited thereto.

The driving unit 212 is coupled to the gates of the first transistor M1 and the second transistor M2. The driving unit 212 is configured to control the first transistor M1 and the second transistor M2 to switch the input voltage Vin and the groud according to the PWM signal, and further output the output voltage Vout at the first end of the inductor L1.

A positive input end and a negative end of the error amplifier 206 are respectively coupled to the reference voltage Vref and the output feedback voltage Vout (also known as the output voltage Vout in the embodiment disclosed herein), the error amplifier 206 is configured to generate a first error signal Verr1 according to a voltage difference between the reference voltage Vref and the output voltage Vout.

A positive input end and a negative input end of the comparator 208 are respectively coupled to an output end of the error amplifier 206 and the sawtooth generator 204, wherein the sawtooth generator 204 is configured to generate a sawtooth signal Sramp according to the PWM signal. The comparator 208 is configured to compare the first error signal Verr1 and the sawtooth signal Sramp to generate the control signal Vc can be generated. In addition, in this embodiment, the compensation unit 210 is coupled to the output end and a groud of the error amplifier 206. In this embodiment, the compensation unit comprises a resistor R1 and a capacitor C1. However, the actual practice of the disclosure is not limited thereto.

In addition, the trigger unit 106 includes an error amplifier 214, a comparator 216, and a logic unit 218. A positive input end and a negative input end of the error amplifier 214 are respectively coupled the reference voltage Vref and the output voltage Vout, and the negative input end of the error amplifier 214 is connected to an offset voltage. The error amplifier 214 is configured to generate a second error signal Verr2 by comparing the reference voltage Vref and the output voltage Vout.

A positive input end and a negative input end of the comparator 216 are respectively coupled to an output end of the error amplifier 214 and the sawtooth generator 204. The comparator 216 is configured to compare the second error signal Verr2 and the sawtooth signal Sramp to output a comparing signal TB.

One input end of the logic unit 218 is coupled to an output end of the comparator 216, while another input end is coupled to the control unit 104. More specifically, in this embodiment, another input end of the logic unit 218 is coupled to the output end of the comparator 208, while an output end of the logic unit 218 is coupled to the PWM generator 202. In this embodiment, the logic unit 218 is implemented as an OR gate. However, the disclosure is not limited thereto. The OR gate is configured to perform OR operation with the comparing signal TB and the control signal Vc to generate the first trigger signal Vstr1.

Figure 3:
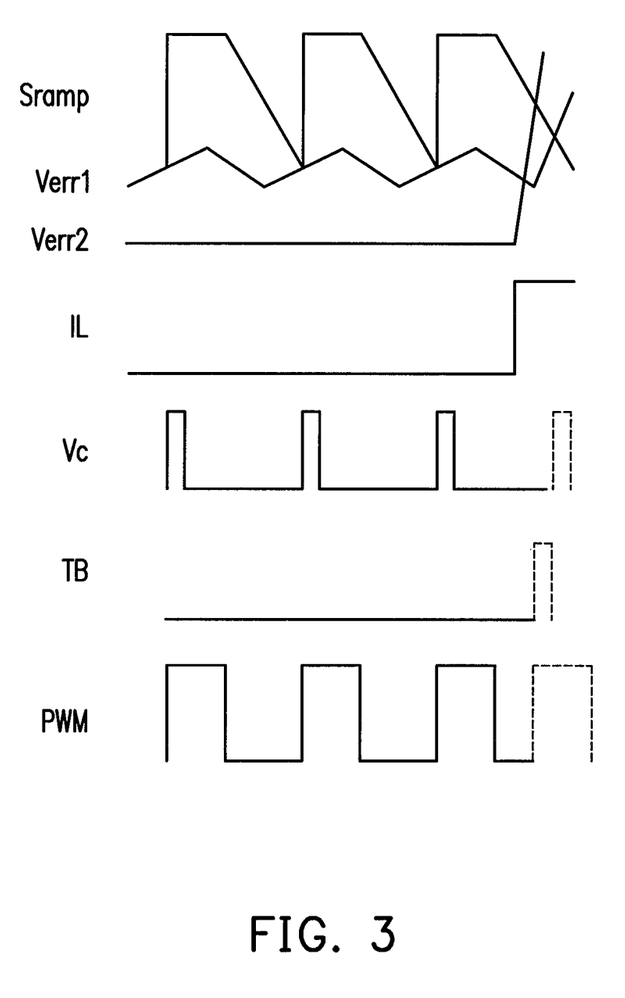
FIG. 3 is a schematic diagram illustrating the waveform of a plurality of signals of the DC-DC converter 200A of the embodiment in FIG. 2A.

FIG. 3 is a schematic waveform illustrating a plurality of signals of the DC-DC converter device 200A of the embodiment in FIG. 2A. Please refer to both FIG. 2A and FIG. 3. When the output voltage Vout is not less than the reference voltage Vref by the present value (in this embodiment, the present value is the offset voltage at the negative input end of the error amplifier 214), a feedback circuit constituted of the error amplifier 206, the comparator 208, and the OR gate 218 regulates the PWM signal generated by the PWM generator 202, such that the driving unit 212, based on the PWM signal, controls the conductive status of the first transistor M1 and the second transistor M2, switches the input voltage Vin and the groud, and regulates the output voltage Vout.

Under the circumstance that the output voltage Vout is less than the reference voltage Vref by an offset voltage, the output voltage Vout is then mainly regulated by a feedback circuit constructed of the error amplifier 214, the comparator 216, and the OR gate 218. As illustrated in FIG. 3, when the load current IL of the load 108 increases and the output voltage Vout is consequently less than the reference voltage Vref by an offset voltage, a voltage level of the second error signal Verr2 rapidly increases. When the voltage level of the second error signal Verr2 is above the voltage level of the sawtooth signal Sramp, the comparing signal TB output by the comparator 216 is also turned into a high voltage level. At this time, since the error amplifier 206 and the comparator 208 is under an influence of the compensation unit 210, the control signal Vc output by the comparator 208 is still at a low voltage level. And the OR gate 218 generates the first trigger signal Vstr1 of the high voltage level according to the control signal Vc and the comparing signal TB, such that the PWM generator 202 outputs the PWM signal in advance.

As the above, this embodiment makes use of the error amplifier 214 and the comparator 216 to compare the reference voltage Vref, the output voltage Vout, and the sawtooth signal Sramp to enable the OR gate 218 to generate the first trigger signal Vstr1. Unlike the error amplifier 206 and the comparator 208 limited by the compensation unit 210, the error amplifier 214 and the comparator 216 are able to rapidly respond to decline of the output voltage Vout, such that the PWM generator 202 is able to generate the PWM signal in advance and significantly improve transient response of the DC-DC converter 200A to load.

Figure 2B:
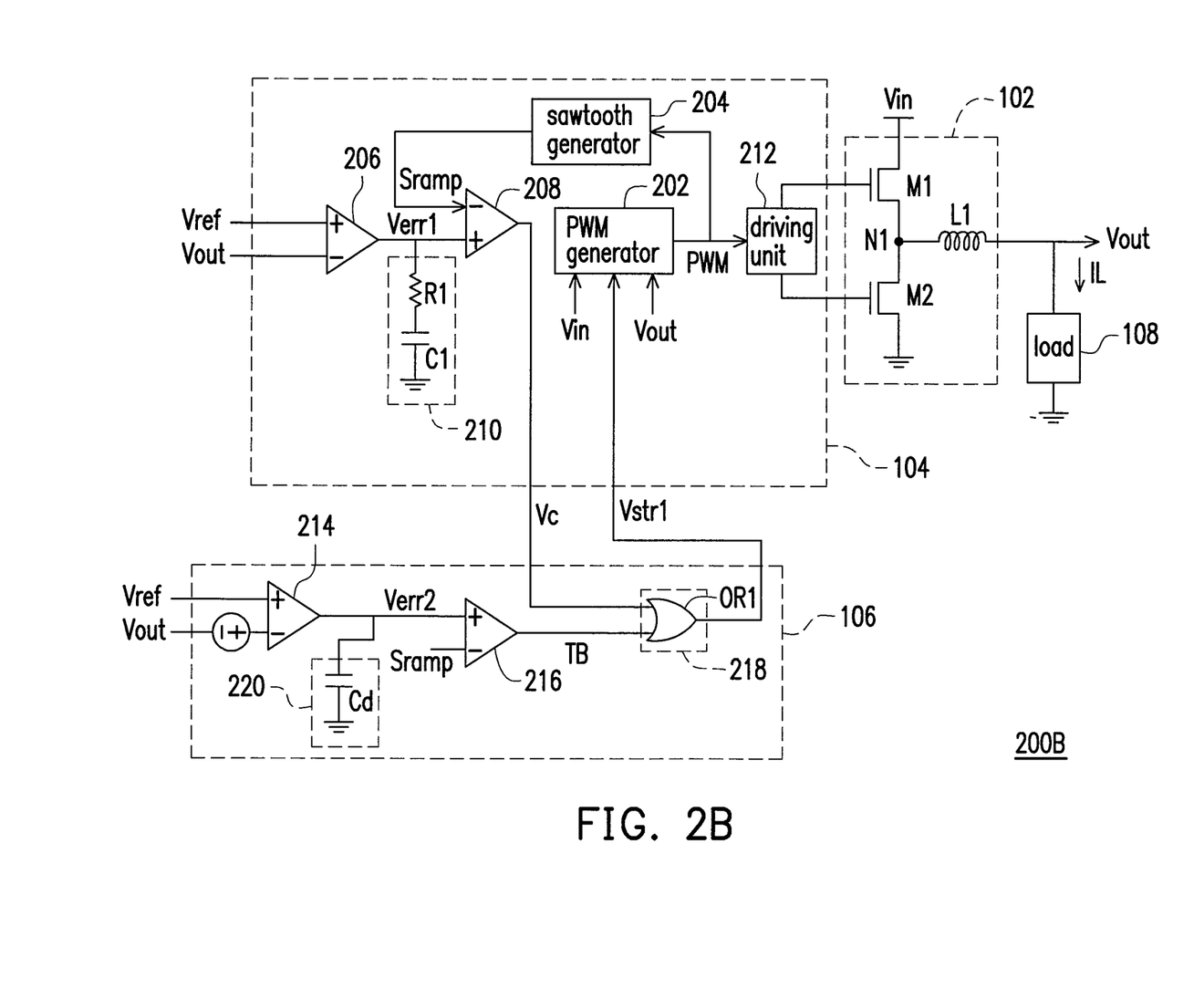

FIG. 2B illustrates a schematic view of a DC-DC converter of another embodiment of the disclosure. Please refer to FIG. 2B. A DC-DC converter 200B of this embodiment differs from the DC-DC converter 200A in that the output end of the error amplifier 214 is further coupled to a delay circuit 220 configured to delay the increasing rate of the voltage at the output end of error amplifier 214. In this embodiment, the delay circuit 220 is implemented with a delay capacitor Cd. However, the actual practice of the disclosure is not limited thereto. Users can determine the size of capacitance of the delay capacitor Cd or add resistance based on actual use of the DC-DC converter 200B to adjust the increasing rate of the voltage level of the second error signal Verr2 output by the error amplifier 214, such that a circuit system using the DC-DC converter 200B can be supplied with the optimal voltage supply.

Figure 2C:
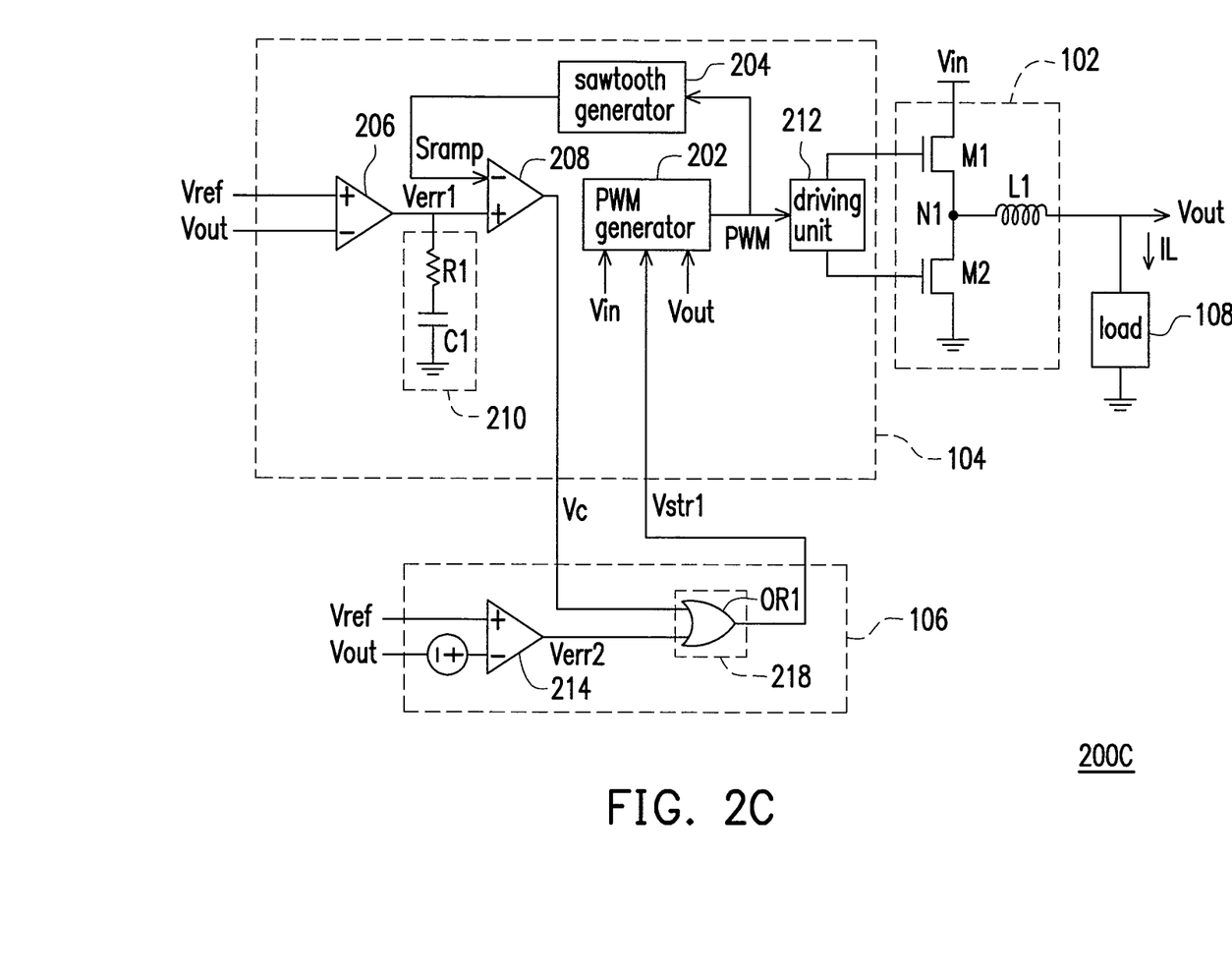

FIG. 2C illustrate a DC-DC converter of another embodiment of the disclosure. Please refer to FIG. 2C. A DC-DC converter 200C of this embodiment differs from the DC-DC converter 200A in that the trigger unit 106 of this embodiment only includes the error amplifier 214 and the OR gate 218, wherein the output end of the error amplifier 214 is coupled to the input end of the OR gate 218. Similarly, the error amplifier 214 also make reference to the reference voltage Vref and the output feedback voltage (in this embodiment, it is the output voltage Vout) related to the output voltage to output the second error signal Verr2, and the OR gate 218 outputs the first trigger signal Vstr1 based on the second error signal Verr2 and the control signal Vc, such that the PWM generator 202 outputs the pulse width modulation signal PWM in advance. Compared to the DC-DC converter 200A, the DC-DC converter 200C of this embodiment does not have the comparator 216, thereby more quickly responds to variation of the output voltage Vout to perform the voltage-regulating process and further increase the speed of transient response.

Figure 4A:
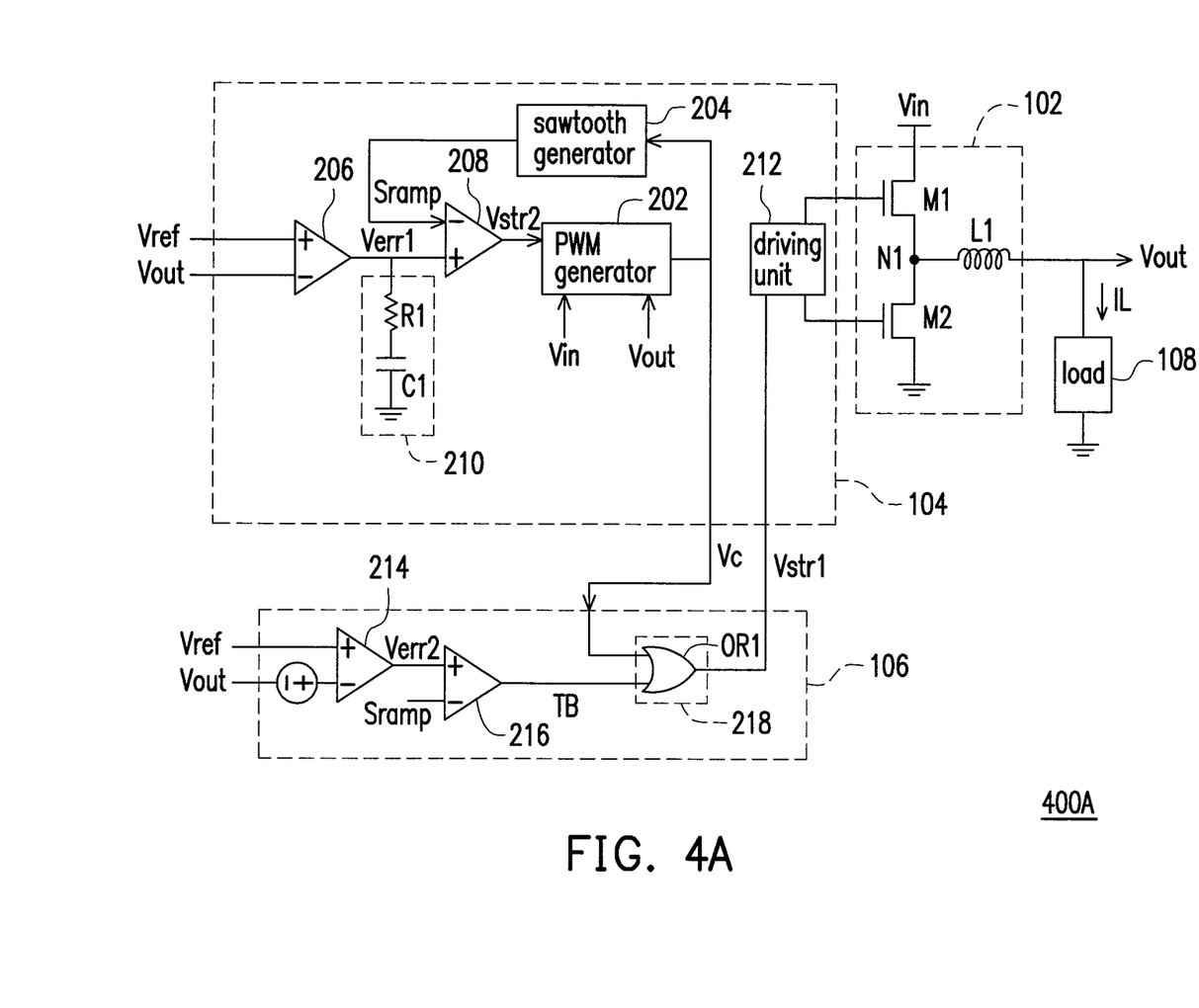
FIGS. 4A-4C are schematic views illustrating a DC-DC converter of an embodiment of the disclosure.

FIG. 4A is a schematic diagram illustrating a DC-DC converter of another embodiment of the disclosure. Please refer to FIG. 4A. A DC-DC converter 400A of this embodiment includes the same elements as the DC-DC converter 200A illustrated in FIG. 2A. The difference between the DC-DC converter 400A and the DC-DC converter 200A is the coupling relations of elements thereof. In the DC-DC converter 400A, the output end of the comparator 208 is coupled to the PWM generator 202, the output end of the PWM generator 202 is coupled to the input end of the OR gate 218, and the output end of the OR gate 218 is coupled to the driving unit 212. The coupling relations of the rest elements remain the same as the DC-DC converter 200A.

Also note that the control signal Vc denotes the pulse width modulation signal output by the PWM generator 202, the signal output by the comparator 208 through comparing the first error signal Verr1 and the sawtooth signal Sramp is defined as a second trigger signal Vstr2, and the first trigger signal Vstr1 output by the OR gate 218 is substantially a pulse width signal in this embodiment.

Figure 5:
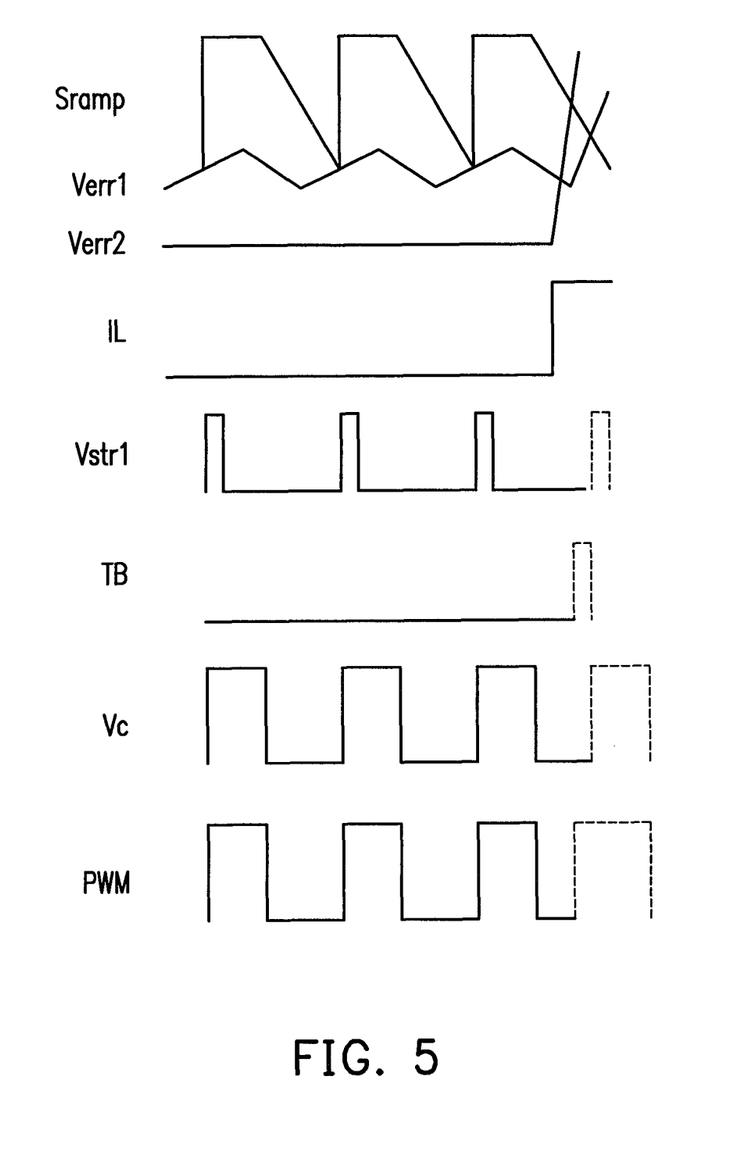
FIG. 5 is a schematic diagram illustrating the waveform of a plurality of signals of the DC-DC converter 400A of the embodiment in FIG. 4A.

FIG. 5 is a schematic waveform illustrating a plurality of signals of the DC-DC converter 400A in FIG. 4A. Similar to the DC-DC converter 2A, when the output voltage Vout is not less than the reference voltage Vref by an offset voltage, the feedback circuit constituted of the error amplifier 206 and the comparator 208 makes reference to the reference voltage Vref, the feedback voltage (the output voltage Vout in this embodiment) related to the output voltage, and the sawtooth signal Sramp to generate the second trigger signal Vstr2 to the PWM generator 202, such that the PWM generator 202 generates the control signal Vc (a pulse width modulation signal) to the OR gate 218. The driving unit 212 controls the conductive status of the first transistor M1 and the second transistor M2 according to the control signal Vc and switches the input voltage Vin and the groud to regulate the output voltage Vout.

Refer to FIG. 5, when the load current IL of the load 108 increases, such that the output voltage Vout is less than the reference voltage Vref by an offset voltage, the voltage level of the second error signal Verr2 is raised rapidly. When voltage level of the second error signal Verr2 is above the sawtooth signal Sramp, the comparing signal TB output by the comparator 216 is also switched to the high-voltage level. Under the influence of the compensation unit 210, the second trigger signal Vstr2 output by the comparator 208 remains at low-voltage level at this moment. Therefore, under the circumstance that the PWM generator 202 is not triggered, the control signal Vc generated by which is also at the low-voltage level correspondingly. The OR gate 218 performs OR operation with the control signal Vc and the comparing signal TB, such that the first trigger signal Vstr1 output by the OR gate 218 is the sum of the control signal Vc and the comparing signal TB. Namely, when at least one of the control signal Vc and the comparing signal TB is at high-voltage level, the first trigger signal Vstr1 is at high-voltage level. Thereby, the driving unit 212 can switch the input voltage Vin and the groud in advance according to the first trigger signal Vstr1 to regulate the output Vout.

As the above, this embodiment uses the error amplifier 214 and the comparator 216 to compare the reference voltage Vref, the output voltage Vout, and the sawtooth signal Sramp to generate the comparing signal TB, and uses the OR gate 218 to perform OR operation with the control signal Vc generated by the PWM generator 202 and the comparing signal TB to generate the first trigger signal Vstr1. The first trigger signal Vstr1 here is a union of the control signal Vc and the comparing signal TB. Therefore, when the control signal Vc is under the influence of the compensation unit 210 and at low-voltage level, the comparing signal TB contained in the first trigger signal Vstr1 may be used to control the driving unit 212 to switch the input signal Vin and the groud in advance, so as to largely improve transient response to load of the DC-DC converter 400A.

Figure 4B:
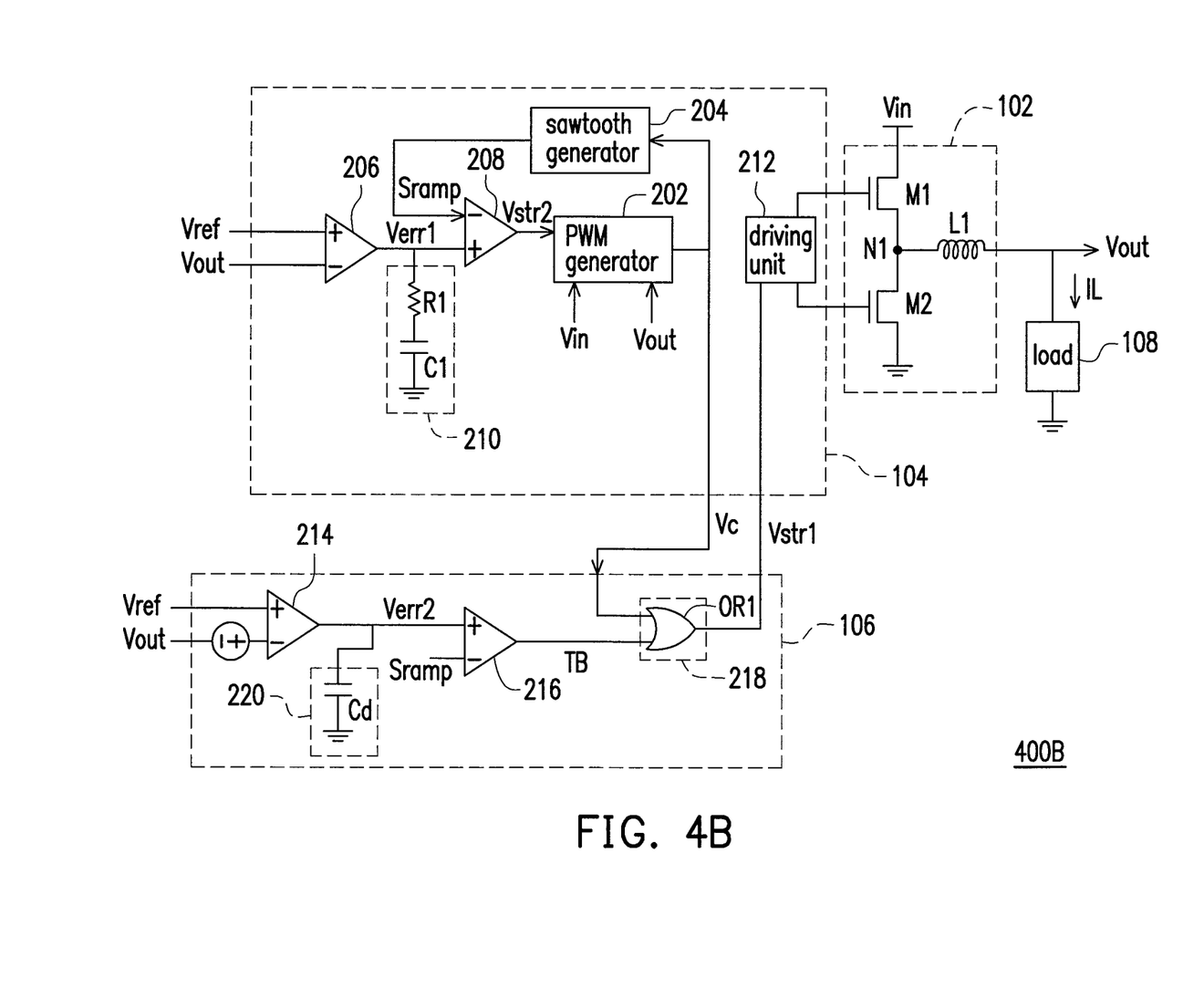

FIG. 4B is a schematic diagram of a DC-DC converter of another embodiment of the disclosure. Please refer to FIG. 4B. Similarly, in a DC-DC converter 400B of this embodiment, the error amplifier 214 may also be coupled to the delay circuit 220 to delay the increasing rate of the voltage at the output end of the error amplifier 214. Users may also determine the capacitance size of the delay capacitor Cd according to actual use of the DC-DC converter 400B to adjust the increasing speed of voltage level of the second error signal Verr2 output by the error amplifier 214 and further allows the circuit system of the DC-DC converter 400B to be supplied with the optimal voltage supply.

Figure 4C:
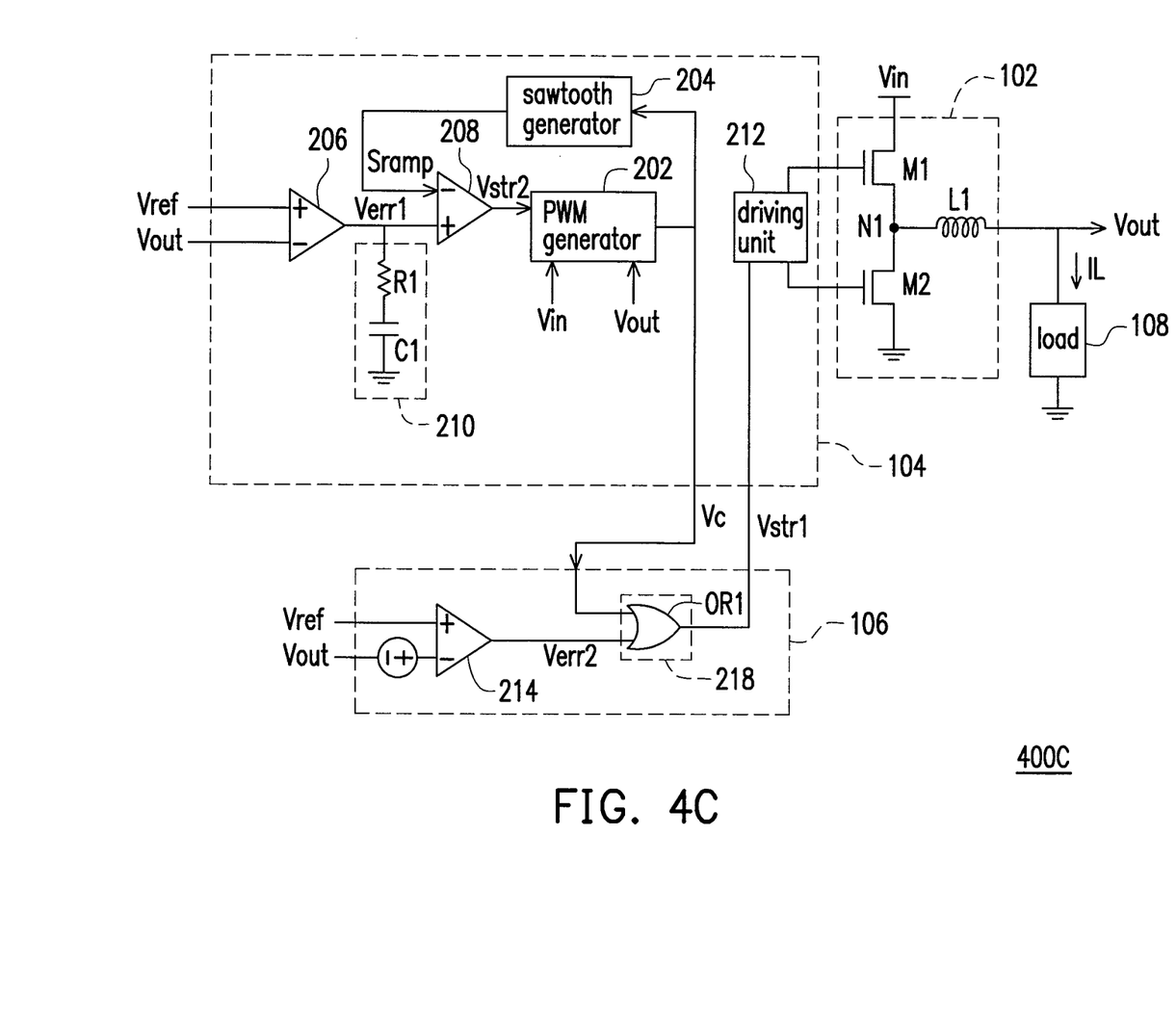

FIG. 4C is a schematic diagram illustrating a DC-DC converter of another embodiment of the disclosure. A DC-DC converter 400C of this embodiment differs from the DC-DC converter 400A in that the trigger unit 106 of this embodiment only includes the error amplifier 214 and the OR gate 218, wherein the output end of the error amplifier 214 is coupled to the input end of the OR gate 218. Similarly, the error amplifier 214 also make reference to the reference voltage Vref and the feedback voltage (the output voltage Vout in this embodiment) relating to the output voltage to output the second error signal Verr2, while the OR gate 218 directly makes reference to the second error signal Verr2 and the control signal Vc to output the first trigger signal Vstr1, such that the driving unit 212 switches the input voltage Vin and the groud in advance according to the first trigger signal Vstr1. Compared to the DC-DC converter 400A, the DC-DC converter 400C of this embodiment does not have the comparator 216, thereby becomes capable of more rapidly responding to variation of the output voltage Vout to perform the voltage-regulating process, and further increasing the speed of transient response.

Figure 6:
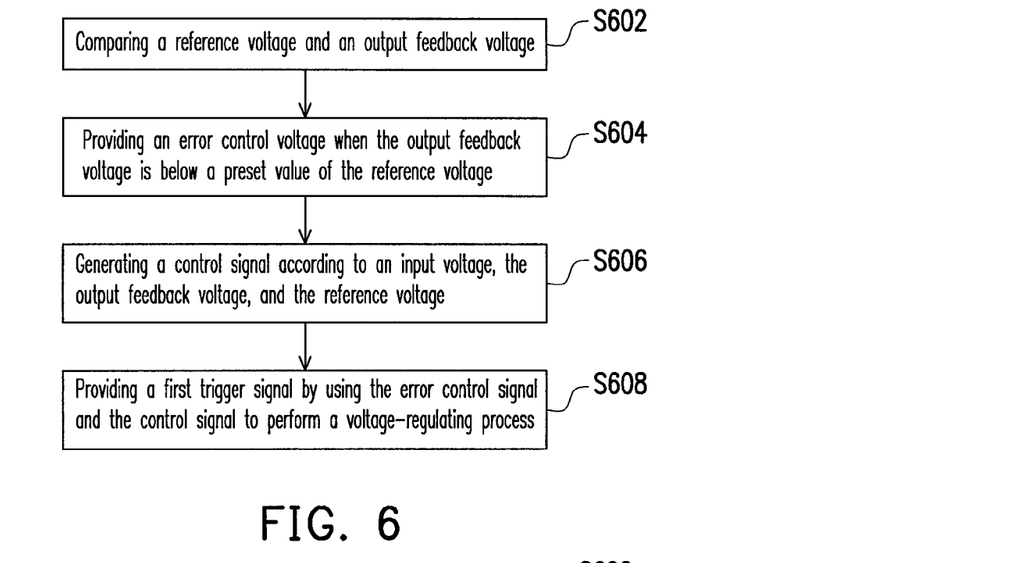
FIGS. 6-7 are flowcharts illustrating a voltage conversion method of a DC-DC converter of an embodiment of the disclosure.

FIG. 6 is a flow chart illustrating a voltage conversion method of DC-DC converter of an embodiment of the disclosure. Referring to FIG. 6, as the above, a voltage conversion method of DC-DC converter may include the following steps. First, a reference voltage and an output feedback voltage are compared at Step S602, wherein the output feedback voltage relates to the output voltage. Then, at Step S604, when the output feedback voltage is less than the reference voltage by a preset value, an error control signal is provided, wherein the error control signal is the error signal Verr2 in the embodiments above. Further, a control signal is generated at Step S606 according to an input voltage, the output feedback voltage, and the reference voltage. Finally, the error control signal and the control signal are used to provide a first trigger signal to perform a voltage-regulating process to the output voltage.

Figure 7:
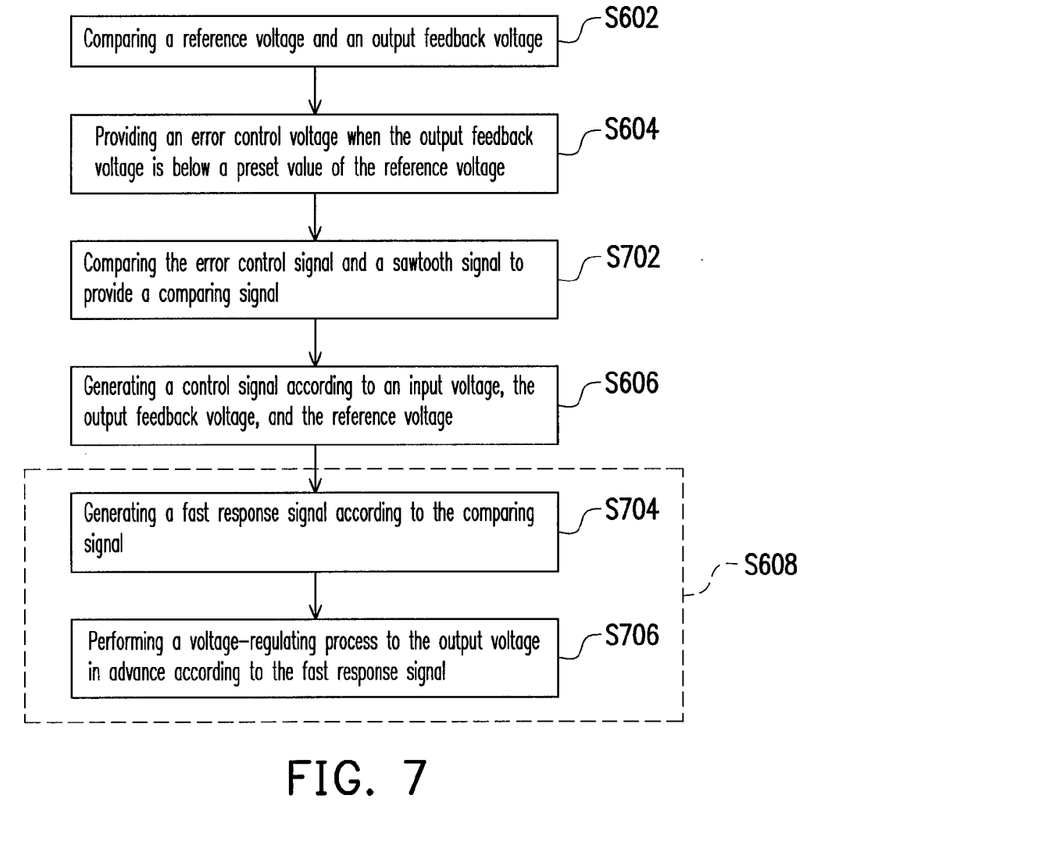

FIG. 7 is a flow chart illustrating a voltage conversion method of DC-DC converter of another embodiment of the disclosure. Referring to FIG. 7, the voltage conversion method of this embodiment differs from the embodiment in FIG. 6 in that this embodiment further includes a Step S702 that compares the error control signal with a sawtooth signal to provide a comparing signal after Step S604. The steps of using the error control signal and the control signal to provide the first trigger signal in this embodiment includes first generating a fast response signal (the first trigger signal described above) according to the comparing signal and the control signal at Step S704, then performing a voltage-regulating process to the output voltage in advance according to the fast response signal at Step S706.

Based on the above, the disclosure uses the first trigger signal generated when the output voltage (or the output feedback voltage) is less than the reference voltage by a preset value to trigger the control unit to control the output unit in advance, such that a voltage-regulating process to the output voltage is performed to increase transient response of the DC-DC converter to load.

Although the disclosure has been described with reference to the above embodiments, it will be apparent to people having ordinary skill in the art that modifications to the described embodiment may be made without departing from the spirit of the disclosure. Accordingly, the scope of the disclosure will be defined by the attached claims not by the above detailed descriptions.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A DC-DC converter, comprising:
 an output unit, receiving an input voltage, and converting the input voltage into an output voltage;
 a control unit, coupled to the output unit, generating a first control signal according to the input voltage, an output feedback voltage relating to the output voltage, and a reference voltage, and controlling the output unit to generate the output voltage; and a trigger unit, coupled to the output unit and the control unit, generating a first trigger signal according to the control signal, the output feedback voltage and the reference voltage, wherein the trigger unit comprises:
  a first error amplifier, generating a first error signal according to the reference voltage and the output feedback voltage;
  a first comparator, generating a first comparing signal according to the first error signal and a sawtooth signal; and
  a logic unit, generating the first trigger signal according to the first control signal and the first comparing signal, wherein the first trigger signal is a fast response control signal;

wherein when the output feedback voltage is less than the reference voltage by a preset value, the first trigger signal triggers the control unit to control the output unit to operate, wherein the control unit comprises a pulse width modulation generator, a sawtooth generator, a second error amplifier, a second comparator, and a driving unit, wherein the second error amplifier receives the output feedback voltage and the reference voltage, the second comparator is coupled to the second error amplifier and the sawtooth generator, the pulse width modulation generator is coupled to the sawtooth generator and the driving unit, and the sawtooth signal is outputted by the sawtooth generator.

2. The DC-DC converter as claimed in claim 1, wherein the logic unit is an OR gate.

3. The DC-DC converter as claimed in claim 1, wherein the first control signal is outputted by the second comparator, and an output end of the logic unit is coupled to the pulse width modulation generator.

4. The DC-DC converter as claimed in claim 1, wherein the first control signal is outputted by the pulse width modulation generator, and an output end of the trigger unit is coupled to the driving unit.

5. The DC-DC converter as claimed in claim 1, wherein the first input end of the second comparator is coupled to a compensation circuit.

6. The DC-DC converter as claimed in claim 5, wherein the first input end of the second comparator receives an analog signal.

7. A DC-DC converter, comprising:
  an output unit, receiving an input voltage, and converting the input voltage into an output voltage;
  a control unit, coupled to the output unit, generating a control signal according to the input voltage, an output feedback voltage relating to the output voltage, and a reference voltage, and controlling the output unit to generate the output voltage; and
  a trigger unit, coupled to the output unit and the control unit, generating a first trigger signal according to the control signal, the output feedback voltage and the reference voltage, wherein the trigger unit comprises:
    a first error amplifier, receiving the reference voltage, the output feedback voltage, and a offset voltage;
    a first comparator, wherein a first input end of the first comparator is coupled to the first error amplifier, and a second input end of the first comparator receives a sawtooth signal; and
    a logic unit, wherein one of its input ends is coupled to an output end of the first error amplifier, and the other of its input ends is coupled to the control unit;
  wherein when the output feedback voltage is less than the reference voltage by a preset value, and the first trigger signal triggers the control unit to control the output unit in advance to operate,
  wherein the control unit comprises a pulse width modulation generator, a sawtooth generator, a second error amplifier, a second comparator, and a driving unit, wherein the second error amplifier receives the output feedback voltage and the reference voltage, the second comparator is coupled to the second error amplifier and the sawtooth generator, the pulse width modulation generator is coupled to the sawtooth generator and the driving unit.

8. The DC-DC converter as claimed in claim 7, wherein the logic unit is an OR gate.

9. The DC-DC converter as claimed in claim 7, wherein the first input end of the second comparator is coupled to a compensation circuit.

10. The DC-DC converter as claimed in claim 9, wherein the first input end of the second comparator receives an analog signal.

11. The DC-DC converter as claimed in claim 7, wherein another input end of the logic unit is coupled to an output end of the first comparator, and an output end of the logic unit is coupled to the pulse width modulation generator.

12. The DC-DC converter as claimed in to claim 7, wherein another input end of the logic unit is coupled to the pulse width modulation generator, and an output end of the logic unit is coupled to the driving unit.

* * * * *